US010039299B2

(12) United States Patent
Ghorbani et al.

(10) Patent No.: US 10,039,299 B2
(45) Date of Patent: Aug. 7, 2018

(54) AUTOMATED METHOD AND SYSTEM FOR RECOVERING PROTEIN POWDER MEAL, PURE OMEGA 3 OIL AND PURIFIED DISTILLED WATER FROM ANIMAL TISSUE

(71) Applicant: Advance International Inc., Livermore, CA (US)

(72) Inventors: Shahmard Maziar Ghorbani, Alamo, CA (US); Kerry Coltun, Alamo, CA (US)

(73) Assignee: ADVANCE INTERNATIONAL INC., Livermore, CA (US)

( * ) Notice: Subject to any disclaimer, the term of this patent is extended or adjusted under 35 U.S.C. 154(b) by 0 days.

(21) Appl. No.: 15/803,115

(22) Filed: Nov. 3, 2017

(65) Prior Publication Data
US 2018/0055070 A1    Mar. 1, 2018

Related U.S. Application Data

(62) Division of application No. 14/052,514, filed on Oct. 11, 2013, now Pat. No. 9,826,757.
(Continued)

(51) Int. Cl.
*C11B 1/10* (2006.01)
*A23D 9/02* (2006.01)
(Continued)

(52) U.S. Cl.
CPC .............. *A23J 1/04* (2013.01); *A23D 9/02* (2013.01); *B01D 3/00* (2013.01); *B01D 11/0288* (2013.01);
(Continued)

(58) Field of Classification Search
CPC ..... A23J 1/04; A23J 3/04; A23J 1/002; C11B 1/10; C11B 1/08; C11B 3/00;
(Continued)

(56) References Cited

U.S. PATENT DOCUMENTS

| 81,987 A | 9/1868 | Cutler |
| 2,679,457 A | 5/1954 | Shaw |

(Continued)

FOREIGN PATENT DOCUMENTS

| CA | 891977 A | 2/1972 |
| CN | 1683397 A | 10/2005 |

(Continued)

OTHER PUBLICATIONS

Asia-Pacific Fishery Commission, "Bread Formulation," Jun. 1996, Summary Report of and Papers Presented at the Tenth Session of the Working Party of Fish Technology and Marketing, pp. 280-281.
(Continued)

*Primary Examiner* — Joseph Drodge
(74) *Attorney, Agent, or Firm* — Wilson Sonsini Goodrich & Rosati

(57) ABSTRACT

The present invention describes a method and an automatic system for recovering protein powder meal, crude and pure omega-3 oil and purified distilled water from a mixture of animal tissue processed in a filter-drier-reaction tank. Animal tissue, for example fish, and organic solvent are directly or indirectly fed into the filter-drier-reaction tank. The filter-drier-reaction tank mixes, heats, and separates solid and heavy liquid portions of the mixture, the organic solvents are automatically recycled back in to the system after distillation. The solid portion is retained in the filter-drier-reaction tank and baked. Solid protein powder product (the protein powder meal) is thus recovered.

38 Claims, 5 Drawing Sheets

Related U.S. Application Data

(60) Provisional application No. 61/794,301, filed on Mar. 15, 2013.

(51) Int. Cl.
| | | |
|---|---|---|
| *A23J 1/04* | (2006.01) | |
| *B01D 11/02* | (2006.01) | |
| *B01D 3/00* | (2006.01) | |
| *B01D 35/02* | (2006.01) | |
| *B01D 36/00* | (2006.01) | |
| *B01J 19/00* | (2006.01) | |
| *B01J 19/18* | (2006.01) | |

(52) U.S. Cl.
CPC ............. *B01D 35/02* (2013.01); *B01D 36/00* (2013.01); *B01J 19/0053* (2013.01); *B01J 19/18* (2013.01); *C11B 1/10* (2013.01); *B01J 2219/0095* (2013.01); *B01J 2219/00909* (2013.01)

(58) Field of Classification Search
CPC ......... C11B 3/001; C11B 3/006; C11B 3/008; C11B 3/02; C11B 3/12; C11B 3/16; A23D 9/02; A23D 9/04; B01J 19/00; B01J 19/0006; B01J 19/0033; B01J 19/004; B01J 19/0053; B01J 19/0066; B01J 19/18; B01J 19/1868; B01J 2219/00049; B01J 2219/00051; B01J 2219/00054; B01J 2219/00069; B01J 2219/00072; B01J 2219/00074; B01J 2219/00105; B01J 2219/0011; B01J 2219/00121; B01J 2219/00132; B01J 2219/00164; B01J 2219/00166; B01J 2219/00182; B01J 2219/00186; B01J 2219/00191; B01J 2219/00193; B01J 2219/00243; B01J 2219/0068; B01J 2219/00686; B01J 2219/00689; B01J 2219/00695; B01J 2219/00698; B01J 2219/007; B01J 2219/0072; B01J 2219/00725; B01J 2219/00734; B01J 2219/00759; B01J 2219/00761; B01J 2219/00905; B01J 2219/00909; B01J 2219/00925; B01J 2219/0095; B01J 2219/00879; B01J 2219/2402; B01J 2219/2418; B01J 2219/2419; B01J 2219/2422; B01J 2219/2423; B01J 2219/2424; B01J 2219/00873; B01J 2219/00889; B01D 3/00; B01D 3/009; B01D 3/42; B01D 11/02; B01D 11/0207; B01D 11/028; B01D 11/0288; B01D 11/0292; B01D 17/00; B01D 17/12; B01D 35/00; B01D 35/02; B01D 35/027; B01D 36/00; B01D 37/00; B01D 2201/54; B01D 2202/00; B01D 2221/00; F26B 1/00; F26B 3/00; F26B 17/00; F26B 19/00; F26B 25/04; F26B 25/06; F26B 2200/02; G05D 7/00; G05D 1/00; G05D 1/02; G05D 1/135; G05D 1/139; G06Q 10/06; G06Q 10/063; G06Q 10/067
USPC ....... 210/143, 177–179, 181, 182, 184, 192, 210/195.1, 205, 259, 260, 323.1, 335, 210/511; 34/524, 526, 573, 586, 90; 202/82, 84, 152; 426/437, 657; 422/187, 422/620, 608, 610, 618, 619, 622, 198, 422/209, 224, 225; 554/20, 175; 366/131, 132, 134, 136, 137, 144, 145, 366/150.1, 152.1, 159.1, 160.1, 162.1, 366/177.1, 241, 279, 292, 342, 343, 348, 366/349; 700/266, 270, 271, 273; 705/1.1, 7.11, 7.22, 400, 413
See application file for complete search history.

(56) References Cited

U.S. PATENT DOCUMENTS

| | | | |
|---|---|---|---|
| 2,680,754 A | 6/1954 | Stapelberg | |
| 2,746,168 A * | 5/1956 | Rickabaugh | ............ F26B 5/041 34/559 |
| 2,875,061 A | 2/1959 | Vogel et al. | |
| 3,200,105 A * | 8/1965 | Barber | ................... B01D 37/02 528/482 |
| 3,252,962 A | 5/1966 | Whaley et al. | |
| 3,520,868 A | 7/1970 | Henderson et al. | |
| 3,615,657 A | 10/1971 | Gastrock et al. | |
| 3,649,294 A | 3/1972 | Thijssen | |
| 3,659,294 A | 5/1972 | Glabiszewski | |
| 3,697,285 A | 10/1972 | Faith, Jr. et al. | |
| 3,835,041 A | 9/1974 | Grant | |
| 3,852,260 A | 12/1974 | Knutsen et al. | |
| 3,898,745 A | 8/1975 | Carlsson | |
| 3,943,233 A | 3/1976 | Swanson et al. | |
| 4,118,285 A | 10/1978 | Yeh | |
| 4,144,229 A | 3/1979 | Karnofsky | |
| 4,213,941 A | 7/1980 | Boomer | |
| 4,246,184 A | 1/1981 | Pressick et al. | |
| 4,266,473 A | 5/1981 | Hunt et al. | |
| 4,277,411 A | 7/1981 | Yahl | |
| 4,298,162 A | 11/1981 | Hohne | |
| 4,335,146 A | 6/1982 | Bladh | |
| 4,405,649 A | 9/1983 | Jeffreys et al. | |
| 4,405,653 A | 9/1983 | Gray | |
| 4,406,831 A | 9/1983 | Atteck | |
| 4,441,797 A | 4/1984 | Maruyama et al. | |
| 4,566,873 A | 1/1986 | Toda | |
| 4,595,501 A | 6/1986 | Queyroix | |
| 4,623,488 A | 11/1986 | Takao | |
| 4,659,469 A | 4/1987 | Gaudfrin | |
| 4,685,899 A | 8/1987 | Cvitas et al. | |
| 4,707,369 A | 11/1987 | Suresky | |
| 4,731,182 A | 3/1988 | High | |
| 4,744,926 A | 5/1988 | Rice | |
| 4,751,060 A | 6/1988 | Kratochwill | |
| 4,790,806 A | 12/1988 | High | |
| 4,797,474 A | 1/1989 | Patroni et al. | |
| 4,820,528 A | 4/1989 | Stroz et al. | |
| 4,820,529 A | 4/1989 | Uchida et al. | |
| 4,825,541 A | 5/1989 | Czeschka et al. | |
| 4,859,371 A | 8/1989 | Diosady et al. | |
| 4,861,495 A | 8/1989 | Pietzsch | |
| 4,871,560 A | 10/1989 | Brokans | |
| 4,888,181 A | 12/1989 | Gray et al. | |
| 4,976,973 A | 12/1990 | Shirakawa et al. | |
| 5,047,004 A | 9/1991 | Wells | |
| 5,053,234 A | 10/1991 | Anderson et al. | |
| 5,097,017 A | 3/1992 | Konwinski | |
| 5,175,355 A | 12/1992 | Streich et al. | |
| 5,178,602 A | 1/1993 | Wells | |
| 5,200,557 A | 4/1993 | Gee et al. | |
| 5,257,968 A | 11/1993 | Caldwell | |
| 5,261,869 A | 11/1993 | Caldwell et al. | |
| 5,267,936 A | 12/1993 | Miachon | |
| 5,342,279 A | 8/1994 | Cooperstein | |
| 5,384,149 A | 1/1995 | Lin | |
| 5,544,425 A * | 8/1996 | Haleen | ...................... F26B 5/04 34/166 |
| 5,614,102 A | 3/1997 | Sakurada | |
| 5,643,468 A | 7/1997 | Ure | |
| 5,658,462 A | 8/1997 | Hopkins et al. | |
| 5,685,975 A | 11/1997 | Joubert et al. | |
| 5,853,791 A | 12/1998 | Roussel | |
| 5,958,233 A | 9/1999 | Willgohs | |
| 5,972,403 A | 10/1999 | Tiller | |
| 6,001,398 A | 12/1999 | Noda et al. | |

(56) References Cited

U.S. PATENT DOCUMENTS

| | | | |
|---|---|---|---|
| 6,005,073 A | 12/1999 | Hultin et al. | |
| 6,055,936 A | 5/2000 | Collin | |
| 6,136,959 A | 10/2000 | Hultin et al. | |
| 6,162,477 A | 12/2000 | Crisinel et al. | |
| 6,190,715 B1 | 2/2001 | Crowther et al. | |
| 6,261,608 B1 | 7/2001 | Lee et al. | |
| 6,288,216 B1 | 9/2001 | Hultin et al. | |
| 6,290,383 B1* | 9/2001 | Shohet | B01F 13/06 366/132 |
| 6,562,952 B1 | 5/2003 | Rajewski et al. | |
| 6,634,508 B1 | 10/2003 | Ishigaki | |
| 6,685,975 B2 | 2/2004 | Saxby et al. | |
| 7,033,636 B2 | 4/2006 | Kelleher | |
| 7,156,801 B2 | 1/2007 | Dircks et al. | |
| 7,462,736 B2 | 12/2008 | Parker et al. | |
| 7,470,370 B2 | 12/2008 | Parker et al. | |
| 7,713,411 B2* | 5/2010 | Banister | F26B 3/08 210/232 |
| 7,763,717 B1 | 7/2010 | Jaczynski | |
| 7,888,530 B2 | 2/2011 | Lin et al. | |
| 7,897,810 B2 | 3/2011 | Lin et al. | |
| 7,956,081 B2 | 6/2011 | Kelleher | |
| 8,152,708 B2 | 4/2012 | Ellsworth et al. | |
| 8,173,014 B2 | 5/2012 | Soerensen et al. | |
| 8,609,157 B2 | 12/2013 | Sclabos Katevas et al. | |
| 8,628,817 B2 | 1/2014 | Ramirez Reid | |
| 8,663,725 B2* | 3/2014 | Ortega | A23J 1/04 426/417 |
| 8,697,906 B2 | 4/2014 | Parker et al. | |
| 8,772,516 B2 | 7/2014 | Sclabos Katevas et al. | |
| 8,815,551 B2 | 8/2014 | Lihme | |
| 8,828,447 B2 | 9/2014 | Soerensen et al. | |
| 8,859,825 B2 | 10/2014 | Parker et al. | |
| 8,865,236 B2 | 10/2014 | Katevas et al. | |
| 8,968,169 B2 | 3/2015 | Eiken | |
| 9,011,942 B2 | 4/2015 | Sclabos Katevas et al. | |
| 9,028,387 B2 | 5/2015 | Eiken | |
| 9,150,815 B2 | 10/2015 | Sclabos Katevas et al. | |
| 9,232,812 B2 | 1/2016 | Soerensen et al. | |
| 9,706,787 B2* | 7/2017 | Ortega | A23J 1/04 |
| 9,826,757 B2 | 11/2017 | Ghorbani et al. | |
| 9,861,945 B1* | 1/2018 | Beetz | B01J 2/04 |
| 2002/0128325 A1 | 9/2002 | Runge et al. | |
| 2002/0151733 A1 | 10/2002 | Ulrich et al. | |
| 2003/0120095 A1* | 6/2003 | Rohr | C11C 1/025 549/413 |
| 2003/0215559 A1 | 11/2003 | Mikaelian et al. | |
| 2005/0037109 A1 | 2/2005 | Soerensen et al. | |
| 2005/0244567 A1 | 11/2005 | Carlsson | |
| 2005/0255228 A1 | 11/2005 | Kellher | |
| 2006/0111578 A1* | 5/2006 | Arhancet | A23D 9/00 554/8 |
| 2006/0128665 A1 | 6/2006 | Leigh et al. | |
| 2006/0251793 A1 | 11/2006 | Junger | |
| 2006/0258872 A1 | 11/2006 | Kase et al. | |
| 2007/0134376 A1 | 6/2007 | Connell | |
| 2008/0066019 A1* | 3/2008 | Worek | G05B 19/4183 700/17 |
| 2009/0061067 A1 | 3/2009 | Tilseth et al. | |
| 2009/0092737 A1 | 4/2009 | Ortega | |
| 2009/0238930 A1 | 9/2009 | Sathivel | |
| 2010/0087935 A1* | 4/2010 | Pettus | G05B 19/41865 700/83 |
| 2010/0092603 A1 | 4/2010 | Bruinsma et al. | |
| 2010/0189874 A1 | 7/2010 | Ortega et al. | |
| 2010/0331580 A1 | 12/2010 | Ridgley | |
| 2011/0160031 A1 | 6/2011 | Ellsworth et al. | |
| 2011/0217386 A1 | 9/2011 | Jansson et al. | |
| 2011/0305817 A1 | 12/2011 | Cho et al. | |
| 2011/0315621 A1 | 12/2011 | Heley et al. | |
| 2012/0073184 A1* | 3/2012 | Cranford | C11B 1/02 44/307 |
| 2012/0190872 A1* | 7/2012 | Cranford | C11B 1/02 554/207 |
| 2014/0148566 A1* | 5/2014 | Denkwitz | C08F 10/06 526/209 |
| 2014/0271045 A1 | 9/2014 | Swanson et al. | |
| 2014/0272045 A1 | 9/2014 | Ghorbani et al. | |
| 2014/0357815 A1* | 12/2014 | Denkwitz | C08F 10/06 526/123.1 |
| 2014/0370115 A1 | 12/2014 | Hoem et al. | |
| 2015/0370115 A1 | 12/2015 | Ge et al. | |
| 2016/0355546 A1 | 12/2016 | Ghorbani et al. | |
| 2017/0311623 A1 | 11/2017 | Ortega | |

FOREIGN PATENT DOCUMENTS

| | | |
|---|---|---|
| CN | 101595939 A | 12/2009 |
| DE | 10160042 A1 | 6/2003 |
| EP | 0280415 A1 | 8/1988 |
| EP | 0301795 A1 | 2/1989 |
| EP | 2361513 A1 | 8/2011 |
| FR | 2168259 A1 | 8/1973 |
| GB | 1156500 A | 6/1969 |
| WO | WO-9740941 A1 | 11/1997 |
| WO | WO-0064567 A1 | 11/2000 |
| WO | WO-0220720 A2 | 3/2002 |
| WO | WO-2011075542 A1 | 6/2011 |
| WO | WO-2014145083 A2 | 9/2014 |
| WO | WO-2014145083 A3 | 11/2014 |
| WO | WO-2016197057 A1 | 12/2016 |

OTHER PUBLICATIONS

Barlow et al., "Fishery By-Products," International Association of Fish Meal Manufacturers, CRS Handbook of Nutritional Supplements No. 19 (1984): 1-23.

Bose et al., Coastal Aquaculture Engineering, Great Britain, distributed by Routledge, Chapman and Hall, Inc., 1991, ISBN 0-7131-2947-6, pp. 345 and 350.

European search report and search opinion dated Aug. 10, 2016 for EP Application No. 14764069.2.

FAO Fishery Industries Division, "The Production of Fish Meal and Oil," Jan. 2007, retrieved from the Internet: URL: http://web.archive.org/web/20070105042516/http://www.fao.org/docrep/003/x6899e/x6899e04.htm.

Final Office Action dated Feb. 24, 2016 for U.S. Appl. No. 14/052,514.

Geirsdotiir, "Protein Isolation from Herring," Norden Nordic Innovation Centre, Icelandic Fisheries Laboratories, (2005): 1-118.

International search report and written opinion dated Sep. 2, 2014 for PCT Application No. PCTUS14/029748.

International search report dated Sep. 27, 2016 for PCT Application No. PCT/US/2016/035908.

Kristinsson et al., "Fish Protein Hydrolysates: Production, Biochemical, and Functional Properties," Critical Reviews in Food Science and Nutrition 40(1): 43-81 (2000).

Liston et al. "Fish Protein Concentrate," Institute for Food Science and Technology, University of Nashington, Seattle, Washington (1970): 285-289.

Non-Final Office Action dated Aug. 5, 2015 for U.S. Appl. No. 14/052,514.

Non-Final Office Action dated Oct. 6, 2016 for U.S. Appl. No. 14/052,514.

Notice of allowance dated Mar. 17, 2017 for U.S. Appl. No. 12/639,946.

Notice of allowance dated Jun. 12, 2017 for U.S. Appl. No. 14/052,514.

Notice of allowance dated Dec. 20, 2013 for U.S. Appl. No. 11/973,106.

Nurdiyana et al., "Optimization of Protein Extraction From Freeze Dried Fish Waste Using Response Surface Methodology (RSM)," International Journal of Engineering and Technology, vol. 5, No. 1, (2008): 48-56.

Office action dated Jan. 7, 2015 for U.S. Appl. No. 12/639,946.
Office action dated Mar. 10, 2011 for U.S. Appl. No. 11/973,106.
Office action dated Apr. 2, 2012 for U.S. Appl. No. 12/639,946.
Office action dated Jun. 4, 2014 for U.S. Appl. No. 12/639,946.

(56) References Cited

OTHER PUBLICATIONS

Office action dated Jun. 29, 2016 for U.S. Appl. No. 12/639,946.
Office action dated Aug. 24, 2010 for U.S. Appl. No. 11/973,106.
Office action dated Sep. 1, 2015 for U.S. Appl. No. 12/639,946.
Office action dated Sep. 6, 2017 for U.S. Appl. No. 15/651,755.
Office action dated Oct. 3, 2012 for U.S. Appl. No. 11/973,106.
Office action dated Dec. 18, 2012 for U.S. Appl. No. 12/639,946.
PCT International Search Report and Written Opinion of the International Searching Authority for International Application PCT/US2010/060602 (filed Dec. 15, 2010), dated Feb. 14, 2011.
Romadhoni, et al. Extraction of Snakehead Fish [*Ophiocephalus straitus* (Bloch, 1793)] Into Fish Protein Concentrate As Albumin Source Using Various Solvent, Jurnal Teknologi, Penerbit UTM Press, vol. 78, No. 4-2, (2016): p. 1-6.
Saha, Extraction of Protein from Hoki and Barracouta Fish Heads for Utilisation as Functional Ingredients, A thesis presented in partial fulfilment of the requirements for the degree of Master of Food Technology at Massey University, Palmerston North, New Zealand (2014): 1-163.
Shaviklo, Development of Fish Protein Powder as an Ingredient for Food Applications: A Review, J Food Sci Technol,Springer, vol. 52, No. 2 (2015): 648-661.
Stillings et al., "Fish Protein Concentrate: A New Source of Dietary Protein," Aug. 1971, Journal of the American Oil Chemists' Society, vol. 48(8), pp. 412-414.
Windsor, "Fish Protein Concentrate," Nov. 2002, retrieved from the Internet: URL: http://web.archive.org/web/20021118202451/http://www.fao.org/wairdocs/tan/x5917e/x5917e01.htm.
Geirsdottir, M. Protein Isolation from Herring. Nordic Innovation Center. Nov. 2005.
U.S. Appl. No. 15/651,755 Office Action dated Mar. 21, 2018.
U.S. Appl. No. 15/173,448 Office Action dated Jun. 21, 2018.

\* cited by examiner

AUTOMATED METHOD AND SYSTEM FOR RECOVERING PROTEIN POWDER MEAL, PURE OMEGA 3 OIL AND PURIFIED DISTILLED WATER FROM ANIMAL TISSUE

CROSS-REFERENCES TO RELATED APPLICATIONS

The instant application is a divisional of the U.S. patent application Ser. No. 14/052,514, filed Oct. 11, 2013, which claims priority to U.S. Provisional Patent Application No. 61/794,301 filed Mar. 15, 2013, each of which application is hereby incorporated by reference in its entirety and for all purposes as if fully set forth herein.

Reference is made to U.S. application Ser. No. 11/973,106 filed Oct. 5, 2007, published as US 2009/0092737 on Apr. 9, 2009, now U.S. Pat. No. 8,663,725 titled, "METHOD FOR DERIVING A HIGH-PROTEIN POWDER/OMEGA 3 OIL AND DOUBLE DISTILLED WATER FROM ANY KIND OF FISH OR ANIMAL (PROTEIN)," sharing a common assignee with the instant application, and incorporated herein by reference.

Reference also is made to U.S. application Ser. No. 12/639,946 filed Dec. 16, 2009, now U.S. Pat. No. 9,706,787 published as US 2010/0189874 on Jul. 29, 2010, titled "SYSTEMS AND METHODS FOR DERIVING PROTEIN POWDER," sharing a common assignee with the instant application, and incorporated herein by reference.

BACKGROUND OF THE INVENTION

Field of the Invention

The present invention generally relates to an automated method and a system for recovering protein powder meal, crude and pure omega-3 oil and purified distilled water, all from animal tissue, such as a variety of fish species and/or fish parts. The protein powder meal is referred as solid protein produce or solid product herein, and the three terms are used interchangeable throughout. The system of the present invention is also known as "SEAVIOR SYSTEM."

Crude omega-3 oil is obtained after extracting and separating the solids from the liquids and oils from the entire fish and it's parts. This crude omega-3 oil is valuable and has a variety of applications. Crude omega-3 oil can be further processed to obtain pure omega-3 oil. Pure omega-3 oil means high purity omega-3 oil that is suitable for human consumption. For example, pure omega-3 oil can include about 80%, 85%, 90%, 95%, 96%, 97%, 98%, 99%, 99.5%, or 99.9% of omega-3 oil. The terms crude omega-3 oil, pure omega-3 oil and omega-3 oil are used interchangeable throughout. Purified distilled water means high purity water that is suitable for human consumption. The terms purified distilled water and water are used interchangeable throughout. The recovered protein powder meal, omega-3 oil and purified water can be used in many fields, for example, as main ingredients in food manufacturing, nutrition products, hunger relief packages, cosmetics and high quality pet food. It should be noted that the method and system of the present invention can be employed with any animal tissue, although preferably, the method and system is used in conjunction with almost any fish and fish bi-catch and recyclable fresh fish parts, as it is a plentiful and sustainable resource.

More specifically, given the mounting world food shortage problems in many areas of the globe, the present invention provides a methodology for producing a high quality protein supplement, which can provide a means to combatting the ever growing malnutrition crisis. The protein supplement can be derived from a wide variety of optional 100% natural resources, such as small short lived fresh and plentiful ocean fish which are considered green and sustainable and is an excellent renewable natural resource and it's use will combat overfishing of certain species and help balance the oceanic eco system, in addition to the discarded fresh fish parts carcasses generated by the fish processing industries. Environmental benefits are realized by recycling these otherwise discarded fresh fish materials in the method associated with the current invention. In an age where there is a growing requirement for green (i.e. environmentally conscious) processing, the ability to reuse and recycle fresh and nutritionally valuable waste materials generated by the general fishery industry affords a certain uniqueness to the current invention.

Discussion of the Related Art

Malnutrition is an issue in developing countries with inadequate techniques and resources for storing perishable foods. Namely, modern technological advances, such as refrigeration systems, come at a price few can afford in remote, impoverished areas.

While water may be one of earth's most abundant resources, obtaining purified drinking water still poses a challenge for millions of people living in developing countries. One reason may be attributed to the proximity to available water sources, e.g., landlocked countries and countries in proximity to bodies of salt water, but not fresh water. Even if proximity is of no concern, financial constraints in developing countries may result in the lack of readily available, efficient water purification systems.

One alternative is to extract vital resources from animal tissue. Whether landlocked or next to the sea, many developing countries have an abundant supply of land or marine animals. Marine animals, more specifically fish, are made up of resources including protein, fish oils including omega-3, and water derived from the fish itself. In view of the techniques employed to recover these products, the shelf-life can be extended. By so doing, the necessity to preserve perishable goods via refrigeration is reduced and/or eliminated.

While animal tissue purification systems and techniques already exist in the marketplace, one major setback is the efficiency in recovering products. Inefficiencies generally are attributed to downtime caused by equipment maintenance and replacement. For example, equipment inlets and outlets, as well as conduits for transferring product, may become clogged. Also, employing many pieces of equipment in the purification system requires additional operator time to individually inspect each piece of equipment prior to verifying the system is appropriate for further processing. What is desired in the art is a more efficient system and process for purifying animal tissue to meet present consumer demands. Also desired is a system and process for improving yield of recovered products from animal tissue. Further desired is a system and process for recovering products with long shelf-lives.

What is further desired is a solvent recycling system that recycles the organic solvent and thus reduces the usage of the organic solvent and the emission of organic solvent (also referred as volatile organic compound (VOC)) into the atmosphere.

SUMMARY OF THE INVENTION

The present invention proposes a unique and first of a kind technology to produce a highly pure and stable protein powder meal which is further supplemented with levels of desirable minerals such as calcium, potassium, zinc and other required inorganic materials. These constituents are naturally derived from bones and flesh that are associated with, for example, raw fish ingredients. The resultant protein powder meal is a complete food source comprising a complete aminogram, whose composition is further complemented by naturally occurring inorganic mineral substances. The nature of the technology utilizes pharmaceutical type processing systems and unit operations to ensure final protein product purity and compliance with requirements that are imposed in a regulated industry.

An objective of the present invention is to provide a more efficient system and method for recovering products from animal tissue. The animal tissue can be raw fish. The raw fish can be any kind of fish and any part of the fish, including sustainable abundant species of fish and fish parts that is ordinarily considered waste.

Another objective of the present invention is to provide a system and method that improves yield of recovered products.

Yet another objective of the present invention is to provide a system and method that improves shelf-life of the recovered products.

A further objective of the present invention is to provide a system and method that recycles the organic solvent and reduces emission of VOC gases into the atmosphere.

The present invention can be considered a general recycling process for fish carcasses and related materials that are discarded daily by facilities in the fish processing industry. The resultant recycling of the otherwise discarded materials to produce a high quality protein product (also referred as "protein powder meal," used interchangeable herein) realizes a green and sustainable process that reduces the burden on the environment.

In one aspect of the present invention, an improved system and method for recovering products from animal tissue is described. Specifically, the technique involves combining animal tissue and organic solvent in sufficient proportions to produce a mixture thereof. The mixture is agitated, heated and filtered in a tank to produce protein powder meal. Preferably, the tank is a single unitary structure. Also recovered is animal oil and water derived from the animal. In a preferred embodiment, the animal tissue is fish, and the recovered products includes fish protein, fish oils and water derived from the fish. In an exemplary embodiment, the solid protein (also referred as "protein powder meal," used interchangeable herein) is transferred to a mill for further processing into a powder. In a yet another exemplary embodiment, a filtered, liquid portion of the mixture is filtered to separate fish oil from water. In a further embodiment, the portion of the mixture retained in the single unitary structure after filtration is combined with recycled organic solvent. The recycled organic solvent is recovered from the liquid portion of the mixture.

In another aspect of the present invention, there is described a system for recovering products from animal tissue. Preferably, the animal tissue is fish. The system includes a filter-dryer reaction tank including one or more inputs and outputs. Animal tissue feedstock and organic solvent are independently, or collectively, fed into the filter-dryer reaction tank. The filter-dryer-reaction tank mixes, heats and filters a mixture containing animal tissue and organic solvent. The filter-dryer reaction tank includes an output for removing filtrate, as well as an output for removing solid product.

BRIEF DESCRIPTION OF THE DRAWINGS

The accompanying drawings, which are incorporated herein and constitute a part of this specification, illustrate embodiments of the invention and together with the description serve to explain the principles of the invention.

In the Drawings.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

DETAILED DESCRIPTION OF THE PREFERRED EMBODIMENTS

The present invention describes a novel system and process for improving the efficiency of recovering products from animal tissue. Also described is a novel system and process for improving throughput, especially yield of solid protein, based upon the initial feed of animal tissue. Further described in the present invention is a system and process for reducing the emission of VOC gases into the atmosphere during the processing of animal tissue.

Generally, condensing plural pieces of manufacturing equipment into a single unitary structure has been shown by the inventors to reduce downtime caused by material flow obstructions occurring at multiple locations in the system. Namely, material flow obstructions occur most frequently at inputs and outputs of manufacturing equipment. Material flow obstructions also occur within conduits connecting different pieces of manufacturing equipment. According to the inventors, processing animal tissue feedstock in a single filter-dryer-reaction tank to recover a wet cake including solid protein significantly improves downtime attributed to maintenance and repair. In addition, the current unitary invention is a highly automated process; more energy efficient; and requires less manpower than a system comprising multiple unit operations. Another advantage directly attributed to employing the above-mentioned system is a reduction in capital and operational costs associated with procuring and maintaining fewer pieces of equipment. Yet another advantage realized by the inventors is an improvement in yield of solid protein and shelf-life, derived from the wet cake by employing the system and method described herein.

The novel system and process will be discussed in greater detail below in view of the exemplary, non-limiting embodiments of the present invention. Each of the embodiments discussed hereinafter, unless expressly noted otherwise, are combinable and envisaged within the scope of the present invention. It is also understood that the embodiments, while preferred, are exemplary, and those of ordinary skilled in the art will understand certain modifications to the embodiments are possible without departing from the spirit of the invention.

System

Figure 1:
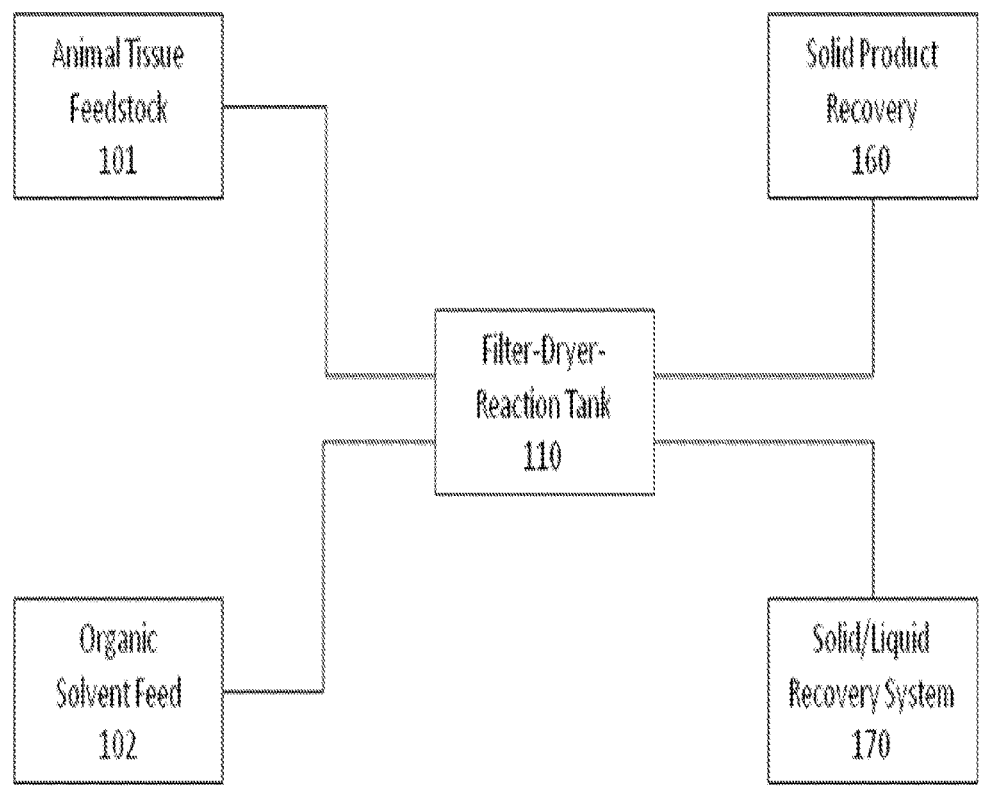
FIG. 1 is an illustration of the present invention in accordance with exemplary embodiments of the present invention.

FIG. 1 is a block diagram illustrating an exemplary embodiment of a recovery system 100 according to a first aspect of the present invention. According to FIG. 1, the recovery system 100 includes an animal tissue feedstock 101 for introducing animal tissue. The animal tissue feedstock may be contained within a storage tank. The storage tank may be temperature controlled. Alternatively, the animal tissue may be housed in a cold room and conveyed downstream for processing either manually by technicians, or by any combination of automatic machinery including but not limited to screw conveyers, conduits/tubes, pumps, blowers, etc. In an exemplary embodiment, 304SS piping may be employed throughout the system. In another exemplary embodiment, a pump constructed of stainless steel may be employed to assist with transferring animal tissue downstream.

The recovery system 100 also includes an organic solvent feed 102 for introducing organic solvent. The organic solvent feed 102 may be contained within a storage tank. The storage tank may have a flat bottom and/or a closed top. The storage tank may also include a level transmitter. The level transmitter preferably is constructed from stainless steel. The tanks may include ports which directly or indirectly communicate with an inlet of nitrogen gas. The storage tank may also include a conservation valve, butterfly valve, and/or diaphragm valve. The organic solvent may be delivered downstream by any combination of equipment including but not limited to piping, pumps, blowers, or the like, as described above. The pump may be stainless steel and centrifugal. Piping may be employed as necessary for interconnecting the process unit operation and downstream equipment.

The present invention involves a highly scalable process and is capable of yielding protein powder and omega 3 oils ranging from lower to higher quantities. The inventive process is also reconfigurable in that parallel trains of systems can be implemented for concurrent production requirements.

Of particular importance, the recovery system 100 also includes a single, unitary, integrated filter-dryer-reactor tank 110 (referred to as "the FDR tank" hereinafter) which receives animal tissue and organic solvent for processing. The FDR tank 110 includes vacuum and heating modules. The FDR tank also includes a filter for separating solids from heavy liquids. The FDR tank 110 also comprises one or more agitation devices that agitate or stir the animal tissue feedstock and solvent mixture, as well as a drying module for yielding dry solid protein product once separated from the liquid component (i.e., the water, oil, solvent). Preferably, the FDR tank 110 is constructed of stainless steel and is of a sanitary design. The FDR tank 110 will be described in greater detail below with reference to FIG. 2.

The recovery system also includes a solid product recovery system 160 and a solvent/liquid recycle (SLR) system 170, as illustrated in FIG. 1. The SLR system 170 may include one or more filtrate recovery tanks. Preferably, the filtrate recovery tanks are made of stainless steel. The filtrate tanks may include one or more ports which directly or indirectly communicate with an inlet for feeding nitrogen gas thereto. The nitrogen blanket maintains the organic solvent in a nonvolatile state. The SLR system 170 will be described in greater detail below with reference to FIG. 3.

Figure 2:
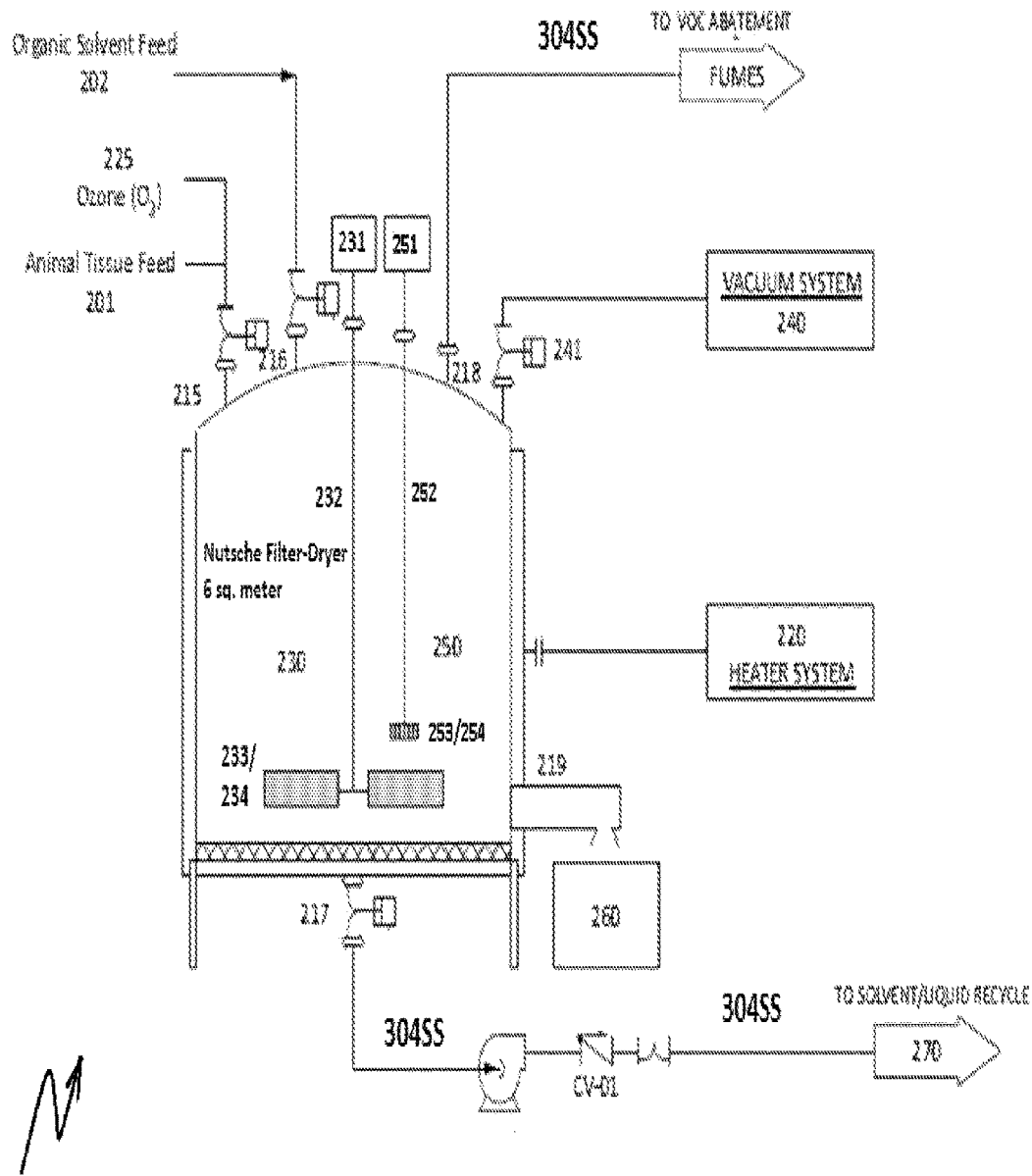
FIG. 2 is a cross-sectional view of a filter-dryer-reaction tank in accordance with exemplary embodiments of the present invention.

FIG. 2 is a cross-sectional view of the FDR tank 110 (also indicated by reference numeral 200 and used interchangeably throughout). The FDR tank 200 is an externally heated metal vessel, with agitation systems, capable of withstanding elevated pressures and vacuum compression vessel made of metal. Preferably the metal is selected from alloys suitable for sanitary processing requirements. More preferably, the metal is stainless steel. In another, exemplary embodiment, the FDR tank 200 generally is a monolithic or unitary structure capable of being pressurized and withstanding high levels of vacuum. That is, the FDR tank 200 is machined as a single piece rather than a collection of devices connected via conduits.

The FDR tank 200 may include a port 215 communicating directly or indirectly with a feed line for introducing animal tissue from the animal tissue feedstock 201 and/or a port 216 communicating directly or indirectly with a feed line for introducing organic solvent from the organic solvent feed 202. Ozone, preferably, is fed from an ozone generator 225 which may be located upstream or downstream of the animal tissue feed 201. The FDR tank 200 may also include a port 218 communicating directly or indirectly with a VOC recycling system that will be discussed later in detail. The FDR tank 200 also includes a port 219 communicating directly or indirectly with a solid product recovery tank 260, which is generally illustrated as "solid product recovery 160" in FIG. 1. The FDR tank 200 further includes a discharge port 217 communicating directly or directly with the Solvent/Liquid Recycle system (SLR system) 270 (which is identified in FIG. 1 as Solvent/Liquid Recycle System 170). Specifically, the SLR system recovers products from animal tissue including animal oils and water derived from the animal itself. The SLR system 270 also recovers organic solvent which may be recycled through the system according to user preferences. The FDR tank 200 may include a pump, a check valve (CV-01), and an isolation valve between the discharge port 217 and the SLR system 270. The check valve (CV-01) can prevent a reverse flow of liquid back from the SLR system 270 into the FDR tank 200.

Surrounding the FDR tank 200 is a heater system 220. In an exemplary embodiment, the outer walls and bottom of the FDR tank 200 are surrounded by a conventional heating jacket containing a heating medium. Generally, the heating medium is steam or alternative heating transfer fluid. Preferably, a steam boiler capable of operating at 6 MMBTU is employed.

The FDR tank 200 may include a primary agitator assembly 230. The primary agitator assembly 230 is located partially inside and partially outside the FDR tank 200. The agitator assembly 230 may include a drive means 231, which is, at least in part, preferably located outside of the FDR tank 200. In an exemplary embodiment, the drive means 231 is located on or above the FDR tank 200. The drive means 231 rotates a vertical, or near vertical shaft 232 which is located in or substantially within the FDR tank 200. The shaft 232 may be rotated, clockwise or counterclockwise, at variable speeds as determined by the operator. The rotation speeds have a variable range. The shaft 232 includes one or more arms 233 with corresponding blades 234 extending there from, which facilitate movement of the feedstock and solvent mixture within the FDR tank 200. The movement helps to ensure uniform heating and drying. The one or more arms 233 may be located at equal or non-equal distances from each another in the vertical and/or horizontal plane extending radially in the direction of the inner wall of the FDR tank 200. Each of the one or more blades 234 located on the one or more arms 233 also radially extends in the direction of the inner wall of the FDR tank 200 and is configured to rotate around the shaft axis. The one or more blades 234 may be located at equal or non-equal distances from each other. The blades 234 may take on a number of shapes; however, the blades are preferably rectangular or substantially rectangular. Further, the blades 234 may include a radially inner portion that is substantially flat and lies substantially in a vertical plane. Alternatively, the blades 234 may lie with a positive or a negative pitch. In yet another exemplary embodiment, one or more of the blades may include a heating mechanism to provide an enhanced method of drying the solid protein product. The heating mechanism may be a part of the heating system 220.

In a separate embodiment, microwave radiation may be employed as an alternate method for drying the solid product. Microwave radiation has been shown to provide more uniform drying while reducing damage to the product otherwise due to conventional heating mechanisms.

The FDR tank 200 may include a secondary agitator assembly 250. Like the primary agitator assembly 230, the secondary agitator assembly 250 is preferably located partially inside and partially outside of the FDR tank 200. The secondary agitator assembly 250 may be a high shear agitator for facilitating mass transfer during the reaction phase of a mixture in the FDR tank 200. The secondary agitator assembly 250 includes a driver 251 that is, at least in part, preferably located outside of the FDR tank 200. It communicates with a rotatable shaft 252, which is preferably located inside or substantially inside the vessel 210. The shaft 252 may include one or more arms 253 and one or more corresponding blades 254. Although the secondary agitator assembly 250 appears to be arranged in FIG. 2 in a vertical orientation, it may, in the alternative, be arranged at any angle relative to the FDR tank 200.

Preferably, the FDR tank 200 also includes a vacuum system 240 capable of drawing a vacuum within the FDR tank 200. The vacuum system 240 includes a vacuum pump 241 to reduce the air pressure in the FDR tank 200.

Discharge of the final bulk solids from the FDR is preferably accomplished by using a pneumatic conveying system. This system avoids the need for manual removal of the product from the FDR. The pneumatic conveying system facilitates discharge of the solid protein product from the FDR to a final bulk container, such as a tote bind or a high strength woven sack.

The FDR system is a highly automated system that utilizes a state of the PLC (Programmable Logic Controller) or similar logic processor. High speed input and output signals are integrated as part of the automation to permit the control system to rapidly respond to process deviations and automatically return the process to within specification. The complex mechanical nature of the FDR requires critical safety interlocks, and the automated system's logic processor scans these conditions on a continual basis to ensure that the FDR equipment and auxiliaries are protected. Customized programming of the logic processor permits the implementation of various software library modules that can be deployed depending on the requirements of the process. For example, different animal tissue feed stocks may require slightly different processing conditions in order to yield high quality protein product. The nature of the automation process will permit the implementation of a recipe driven system that can be tailored to various feed stocks and related processing conditions.

In another embodiment, the automated system used for the production of protein shall conform to a hierarchical model that combines process automation with Business Intelligence (BI) involving Manufacturing Execution Systems (MES) encompassed by an overarching Enterprise Resource Planning (ERP) system. The Instrumentation, Systems and Automation (ISA) S95 standard establishes a four tier hierarchical model for a manufacturing enterprise network. It characterizes generic application software and network architectures for manufacturing control systems as described under Table 1. The primary protein production process occurs at Level 0 with Level 1 instrumentation that monitors the process operating parameters within specification. Level 2 comprises the logic controllers, which may include a combination of PLC, DCS or SCADA systems. These Level 2 logic processors contain the proprietary source code and application recipes that define the protein production process. Since the Enterprise Control System is by definition a networked structure, information and data derived from the process and Levels 1 and 2 are transferred to Level 3 material planning and quality systems. Level 3 is the repository for raw material and finished goods analytical data as well as inventory levels. Level 4 is the final repository for all information related to the protein manufacturing operations. Level 4 analyzes internal manufacturing data and couples it against external marketing an forecasting information in order to optimize the schedule, raw material usages, and finished goods inventories.

TABLE 1

SA95 Enterprise Control System Integration Hierarchy

| SA95 Layer | Function | Description |
| --- | --- | --- |
| Level 4 | ERP | Enterprise Resource Planning |
|  | CRM | Customer Relationship Management |
|  | APO | Advance Planning Optimization |
| Level 3 | MES | Manufacturing Execution Systems |
|  | LIMS | Laboratory Information Management Systems |
|  | CMMS | Calibration Maintenance Management Systems |
|  | WMS | Warehouse Management Systems |
| Level 2 | PLC | Programmable Logic Controllers |
|  | DCS, BAS | Distributed Control Systems, Building Automation Systems |
|  | SCADA | Supervisory Control and Data Acquisition |
| Level 1 | Devices | Process measurements and terminal control equipment |
| Level 0 | Process | The physical manufacturing process |

Figure 3:
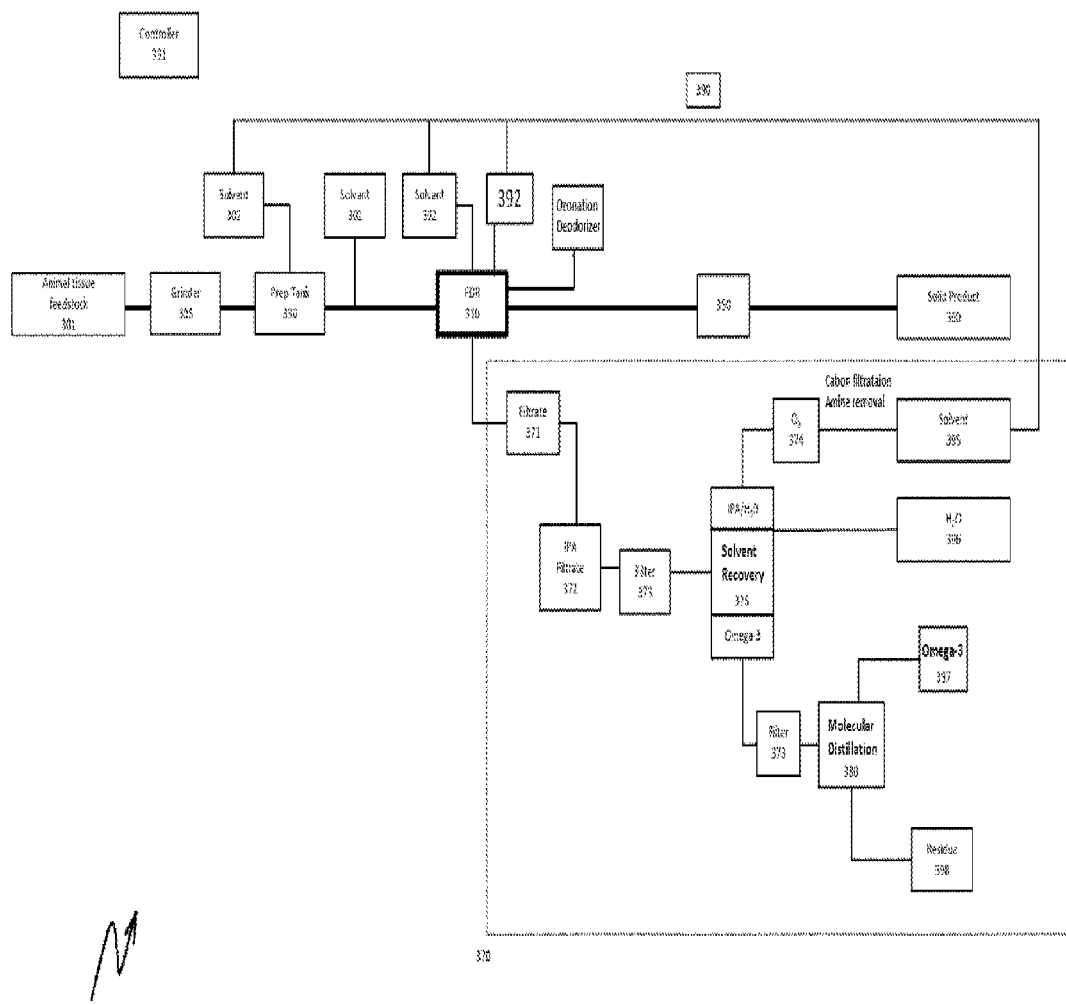
FIG. 3 illustrates a recovery system for recovering protein powder meal, omega-3 oil and purified water in detail in accordance with exemplary embodiments of the present invention.
Figure 4:
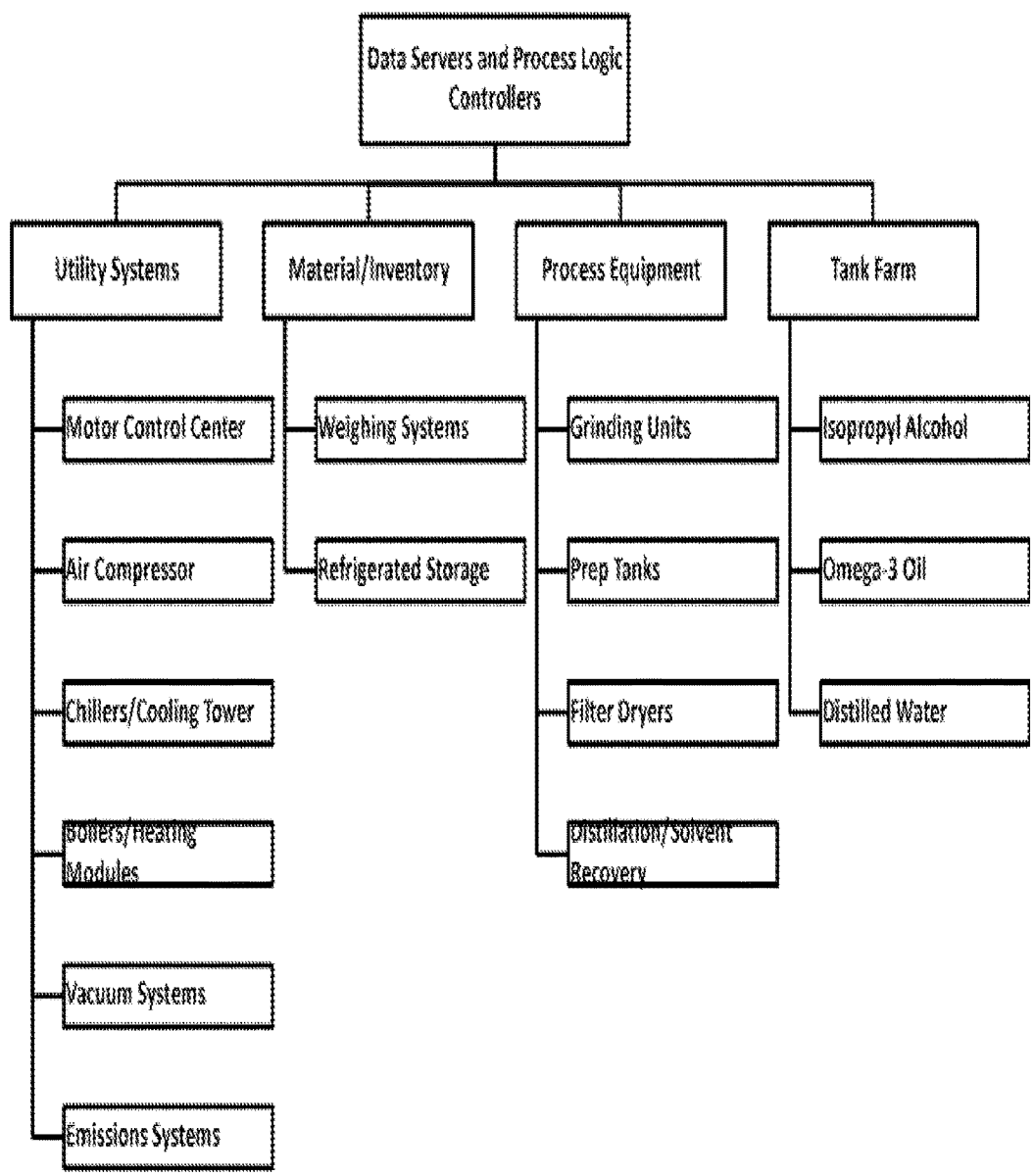
FIG. 4 illustrates functional hierarchy associated with the automation and control system network for the plant level unit operations are for controlling and operating the protein manufacturing plant in detail in accordance with exemplary embodiments of the present invention.
Figure 5:
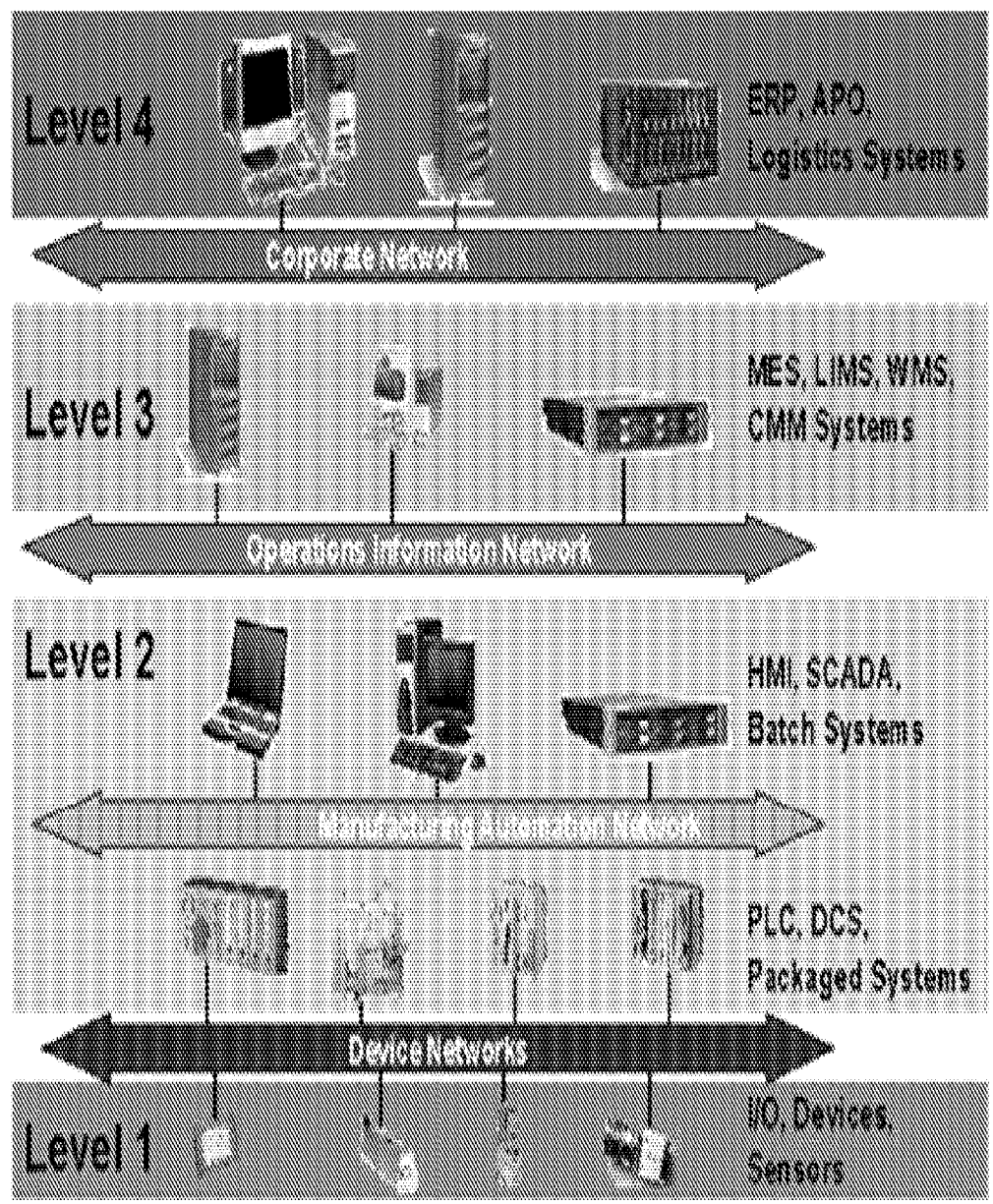
FIG. 5 illustrates the SA95 object model hierarchy associated with the Enterprise Resource Planning (ERP) system that depicts a vertical transaction model between the detailed production systems and corporate planning systems in detail in accordance with exemplary embodiments of the present invention.

FIG. 3 illustrates a recovery system 300 (also indicated by reference numeral 100 and used interchangeably throughout) in greater detail in accordance with exemplary embodiments of the present invention. More particularly, FIG. 3 illustrates the SLR system 370 in detail (also indicated by reference numeral 370 in FIG. 2 and used interchangeably throughout). In addition to the detailed features illustrated in FIG. 3, the recovery system 300 may further include such features as air compressors and nitrogen systems, for example, to maintain an inert environment inside the aforementioned filtration and storage tanks, depending on the type of organic solvent(s) used. The recovery system 300 may also employ sensors for detecting explosive conditions and corresponding alarms to indicate, for example, that the concentration of organic solvent vapors exceed permissible threshold limits.

Turning attention back to FIG. 3, the SLR system 370, as mentioned, comprises a filtrate tank 371, although more than one tank is conceivable (see filtrate tank 372). The filtrate tank 371 may be located upstream of one or more filters 373. The filters 373 help remove residual solids from the filtrate (i.e., the solvent, liquid and oil mixture). The filters 373 may be located anywhere in the SLR system 370 as required for the removal of the residual solids.

The SLR system 370 may also include a distillation unit 375, such as a fractional distillation tower or WFE (wiped film evaporator). Distillation unit 375 operates to recover fats/oils from the organic solvent/water. Distillation unit 375 may be located downstream of the filtrate tank 371. Pumps and blowers may be employed as necessary for transferring the various liquids downstream for further processing. The SLR system 370 may include more than one distillation unit, if needed.

The SLR system 370 preferably includes an ozone generator 374. As shown in FIG. 3, the ozone generator 374 is located downstream of the filtrate tank 371, and it reacts with and neutralizes amines in the filtrate, thereby eliminating the odor (e.g., fishy odor) associated with the amines. Odors associated with fish are due to the natural process of decay. Bacterial enzymes attack the flesh of fish, and this triggers an oxidation reduction reaction. The muscle of the fish which contains trimethylamine oxide (TMAO) breaks down by decomposition, thus producing trimethylamine and dimethylamine. These two amines give rise to the characteristic fishy odor. Thus, the ozone removes this odor by destroying the molecules, bacteria, and spores that cause unpleasant smells. Triatomic oxygen is ozone. In a reverse reaction using Ozone, the third oxygen atom attaches itself to the amine molecules and ultimately renders them odorless. The ozone generator 374 can be also located at other part of the SLR system 370 where deodorization is needed.

Deodorization of the solvent and liquid products are further achieved through the use of in-line activated carbon filters. Activated carbon is a well established material for removal of organic contaminants from a process stream. The benefit of using activated carbon in the SLR process is that trace amines are further eliminated along with the associated odor attributed to the fishy amine smell.

The SLR system 370 may include condensers downstream of the distillation unit 375 to recover water and organic solvent. Further processing equipment may be required as necessary to obtain purified water. The purified water may then be transferred to a recovery tank 396.

The SLR system 370 may further include one or more distillation units 380 to recover purified animal oil (e.g., omega-3 oil). Preferably, the distillation unit 380 may contain a phase separation apparatus. The distillation unit 380 is located downstream of the distillation unit 375. The distillation unit 380 generally separates the animal oil from waste solid fat. The distillation unit 380 may, for example, be a Thin Film Evaporator (TFE), Wiped Film Evaporator (WFE) or a molecular distillation unit. Specifically, a molecular distillation unit, may be employed to recover a purified omega-3 oil from waste solid fat. Various grades of purity may be achieved and techniques readily known in the art may be employed to achieve a final grade of omega-3 oil. Oil may be transferred to a recovery tank 397 while residues are captured in a tank 398.

Referring back to FIG. 3, recovery system 300 may include a controller 391. The controller 391 may include an electrical motor control center. The controller generally provides the operator with an interface through which the operator can achieve real-time, automated control over the various components and subsystems that make up recovery system 300. The controller 391 may, for example, communicate with and/or provide control over tank volumes, temperatures, device states, sensors and alarms.

The system 300 may further include one or more grinders 305. The grinders 305 are preferably made of stainless steel construction and configured to grind raw animal tissue feedstock, such as fish, into ¼" to ½" cube sizes. The grinders 305 are located upstream of the FDR tank 310, such that the grinders 305 grind animal tissue feedstock received from the animal tissue feedstock storage tank/room 301 into smaller particles, as specified above, for further processing.

After the animal tissue feedstock is ground, the feedstock may be combined with an organic solvent for preparing a homogenized slurry or mixture. As shown in FIG. 3, system 300 includes preparation tanks 330 for combining the animal tissue feedstock and the organic solvent. The preparation tank 330 preferably processes up to 50 gpm. The preparation tank 330 may be a heated agitated tank. The preparation tank 330 is also located upstream of the FDR tank 310. Level sensors and flowmeters may be employed in or associated with the preparation tank 330, in order to provide feedback information to the operator through controller 391, to help ensure adequate flow in accordance with operator preferences.

System 300 may also comprise a milling apparatus 350 and a solid product recovery system 360. The milling apparatus 350 mills the solid product to obtain a granular or powder form of the recovered solid protein. The milled product may further be cured in an oven. After curing, the finished product is stored in a final product storage facility. Upon completion of these processes, the product with all of its protein properties, can be managed in such a way so as to give it physical characteristics sufficient to allow it to be consumed and ingested by children and adults easily and without unpleasant flavors or odors which have a disagreeable impact or which give rise to rejection. For example, without limitation, the powder may be pressed into a solid pill form, placed in a capsule to be swallowed, or added to a liquid and consumed as a beverage. The recovered solid protein may then be collected by the solid product recovery system 360.

Recovery system 300 also comprises an organic solvent recycle system 390. Preferably, the solvent is isopropyl alcohol (IPA); however, it will be readily apparent to those skilled in the art that solvents other than IPA may be used. As mentioned above, the organic solvent may be distilled from the water by use of a heated still and condensers. However, once the solvent is removed from the water, the solvent may be transported back to a solvent storage tank 302. This recycled organic solvent may or may not be combined with new or fresh solvent prior to being transferred to the FDR tank 310, where it will be combined with re-filtered wet cake, or transferred to preparation tank 330, where it will be combined with the animal tissue. Refiltered wet cake is the residual solid protein product that remains behind in the FDR following each reactor recycle process. Recall that once the raw fish/IPA mixture is sent to the FDR tank 310. IPA is then filtered off and the filtrate is transferred to the solvent recovery system. Solid protein product remains behind in the FDR tank 310. Another charge of IPA is then sent to the FDR tank 310 where the solid protein product undergoes a second reactor/heating/filtration cycle.

IPA is once again filtered off leaving behind the solid protein "wet cake". This recycle process is conducted one more time for a total of 3 times. In general, the total number or recycles will range from 1 to 4, and is determined by the final product desired quality. The FDR tank 310 and preparation tank 330 may receive one of the following with respect to organic solvent: entirely new (fresh) organic solvent, entirely recycled organic solvent, or a combination thereof. As is apparent, the solvent recycle system 390 includes piping, as described above, for transporting the organic solvent between the solvent recovery tank 395 of the SLR system 370, the organic solvent storage tank 302 and the FDR tank 310.

The recovery system 300 may include a recovery tank 396 for collecting water, a recovery tank 397 for collecting oils, including omega-3 fatty acids, and a residue discarding tank 398 for collecting residue. Still further, recovery system 300 comprises a VOC recycling system 392 for capturing emissions of fumes/vapors formed in the FDR tank 310. As shown in FIG. 3, for example, emissions exit the vessel FDR tank 310 via a port, and the vapors may be transferred to a fume condenser and chiller for condensing the vapors into usable organic solvent. The condensed organic solvent may be transferred via a solvent recycle line to the organic storage tank 302 for reuse.

Process

According to an aspect of the present invention, a process is described for recovering products originally derived from animal tissue. In one embodiment, solid protein product is recovered. In another embodiment, solid protein product in addition to water derived from animal tissue are recovered. In a further embodiment, solid protein product, water and animal oil derived from the animal tissue are recovered.

Animal tissue, for the purposes of this application, is defined as having eukaryotic cells of various shapes and sizes. Animal cells are further characterized as excluding cell walls which are present in all plant cells. The animal tissue may include but is not limited to land and marine animals such as insects, fish, poultry and red meat. In an exemplary embodiment, the animal tissue feedstock contains fish. In yet another exemplary embodiment, animal tissue feedstock is maintained at temperatures less than 50° F., preferably less than 45° F., and more preferably less than or equal to 40° F., prior to being processed by the purification system of this invention.

As stated, the animal tissue may be fish, and in particular, raw fish. The raw fish should be fresh and handled in a sanitary manner. The quality of the raw material should also be verified. The fish is also ground, as explained above (see e.g., mill 350), into pieces so as to form a fishmeal prior to mixing with organic solvent and further processing.

An organic solvent is generally employed in the process. The solvent may include an alcohol, wherein the hydroxyl functional group is bonded to a carbon atom. In an alternative embodiment, the solvent may be selected from those organic solvents with a volatile organic content (VOC) ranging between about 200-500 g/L. In still another alternative embodiment, the solvent is selected such that it meets VOC regulations promulgated by local governing authority. In a preferred embodiment, the solvent, as stated, is IPA (isopropyl alcohol).

A mixture of fishmeal and solvent is initially heated; however, a low heat is preferably used so there is no risk of decomposition of the protein product due to thermal degradation. The mixture of fishmeal and solvent should sufficiently be balanced so that the fishmeal dissolves into a viscous liquid during processing in the FDR tank, and in particular, the heating process, which is done at a controlled temperature by means of a variable control system that prevents the destabilization of the which, in turn, would reduce or eliminate the potency of the protein. The ratio of animal tissue to solvent will, of course, depend on various factors including but not limited to the specific animal tissue and solvent used. Where the animal feedstock is raw fish and IPA is employed as the organic solvent, the ratio of fish in kilograms to IPA in liters ranges between about 1:1 to 1:2.2; 1:2.1; 1:2.0; 1:1.9; 1:1.8; 1:1.7; 1:1.6; 1:1.5; 1:1.4; 1:1.3; 1:1.2; and 1:1.1. More preferably the ratio is about 1:2. In a preferred, commercial embodiment of the present invention, upon scale-up, about 5,000 Kg of raw fish and about 10,000 L of organic solvent are combined to form the mixture of fishmeal and solvent.

As illustrated in FIGS. 1-3, the mixture of animal tissue and organic solvent is fed, e.g., via a screw conveyer from the preparation tank (e.g., see preparation tank 330) to the FDR tank (see e.g., FDR tank 310), where it is heated, with agitation at a temperature ranging between 45-75° C. for approximately 2 hours in the FDR tank. The primary agitator assembly, as discussed above, ensures uniform heating and prevents decomposition of the animal tissue and organic solvent mixture, particularly that portion of the mixture in proximity of the walls or bottom of the compression vessel. In doing so, protein with a high concentration is recovered, specifically with 85% or higher pure protein, as characterized through a complete aminogram. An aminogram is a collection of amino acids present in a product depending on the type of animal tissue. The recovered protein may be a complete aminogram, non-hygroscopic, and substantially free, of fish odor or smell contributed by amines. The recovered protein may also be non-hygroscopic and sterile, and visually, the protein, may exhibit a cream color.

The animal tissue may be fed by a screw conveyer to a preparation tank (see e.g., preparation tank 330). The organic solvent is then added to ensure an adequate mixture is formed prior to being fed to the FDR tank (see e.g., FDR tank 3). The preparation tank may also include an agitator, as well as a jacketing and insulation system to permit external heating and cooling. Preferably, the mixture is heated to a temperature not exceeding 75° C., for example, about 45-50° C. The resulting homogeneous mixture is then fed to the FDR tank.

In the FDR tank, the homogeneous mixture is again heated and agitated, then filtered. The residual protein wet-cake is then dried, preferably using heat and vacuum or microwave. By so doing, several unit operations are condensed into a single piece of equipment. Namely, slurry vessels, product centrifuges/filtering mechanisms, stand-alone drying apparatuses, along with accompanying valves, conduits, blowers, pumps, sensors, controllers, and the like, that assist with the transfer of the mixture between each operation are not required. As a result, production cycle time for recovering product, such as for example solid protein, significantly is reduced. Within the FDR tank, the process generally is automated and operates in closed circuit, e.g., closed system.

After the mixture is heated and agitated for a period of approximately 2 hours, as mentioned above, the FDR tank operates in a filtration mode. The filtrate including the organic solvent is discharged from the FDR tank to the SLR system. A wet cake is retained in the FDR tank. The FDR tank then operates in heating/drying mode under full vacuum at a temperature not exceeding 80° C., for example, from about 50-80° C. for 1 hour to 10 hours to recover solid.

After filtration, one or more heating, agitation and filtration cycles may be employed. For each additional heating, agitation and filtration cycle, organic solvent is fed into the FDR tank. As explained above, the solvent may be new (fresh) solvent, recycled solvent recovered from the SLR system, or a combination of both. The recycled solvent may be transferred from the SLR system through the use of a solvent recycle system (see e.g., solvent recycle system 390) to the solvent storage tank (see e.g., solvent storage tank 302), thus promoting green manufacturing initiatives. After the above-mentioned one or more heating, agitation and filtration cycles, the FDR tank operates in heating/drying mode under full vacuum at a temperature ranging from about 50-80° C. for 1 hour to 10 hours to dry and recover solid protein from the solid portion of the mixture retained in the FDR tank.

The recovered solid protein is ultimately discharged from through an outlet port in the FDR tank to a storage tank. The solid protein may be reviewed and analyzed by quality control to ensure adequate yield of protein. In an exemplary embodiment, the solid protein is present in a yield of about 15-25 wt. % based upon the animal tissue entering the FDR tank 110. Preferably, the yield is greater than about 18 wt. % solid protein recovered from animal tissue entering the FDR tank 110.

A laboratory analysis of the recovered solid protein from the system exhibited protein concentrations in the range of about 85-95%. The quality of the final product is generally excellent at least because the product is not degraded as the process is low temperature, e.g., not generally exceeding 80° C., in order to prevent thermal degradation of the protein. Hence, the organoleptic structure is maintained resulting in a relatively complete amino gram on the high quality concentration of protein on the final product. The product exceeds all FDA requirements for a supplement and is an excellent product for world food needs. The 35 gram serving provides sufficient protein to meet a person's amino acid requirement like a full meal. The most frequently used methods for making these determinations at the protein level, are electrophoresis and thin layer chromatography; and it has been possible to demonstrate that there exists at least one specific protein for each species.

The recovered protein also has a long shelf life defined as maintaining a fairly constant profile over a long period of time. In one embodiment, the recovered solid protein product was tested in a laboratory simulating environmental conditions over 10 years. The constant profile may be attributed to the product's non-hygroscopic, or substantially non-hygroscopic nature. That is, the recovered, solid protein does not absorb humidity or grow any bacteriological processes in view of the low moisture content. Preferably the moisture content is less than about 8 wt. % of the recovered, solid protein.

The recovered protein has amino acid compositions that are balanced to afford a nutritionally advantageous characteristic. The recovered protein may also be sufficiently stable and sterile, i.e., substantially or entirely 100%.

Further, in accordance with the process of the present invention, the filtrate (i.e., the heavy liquids) that are extracted as a result of the filtering in the FDR tank is transferred to the SLR. The filtrate may include but is not limited to oils, fats, solvent and water. When the animal tissue is fish, the oil may include omega-3 fatty acids. In the SLR system, the filtrate may first be transferred to a filtrate tank (see e.g., filtrate tank 371), and subsequently filtered once again (see e.g., filter 373) to remove residual solids. Alternatively, the filtrate may directly be transferred to a solvent recovery or distillation tower (see e.g., distillation unit 375), in order to separate the organic solvent/water from oils/fats. As previously stated, the solvent may be transferred to a recovery tank 395, and thereafter, employed as recycled organic solvent. The water may be transferred to a recovery tank 396 and purified further as necessary.

The recovered oils, for example, omega-3 fatty acids, may be filtered to remove residue (see e.g., filter 373) and to increase the purity thereof. It may also be treated with ozone to remove the odor by neutralizing any amines present in the oil. The residue may be transferred to a discarding tank (see e.g., residue discard tank 398). The oils, including omega-3 fatty acids, may be transferred to a first recovery tank (see e.g., recovery tank 397). There, the oil may undergo further purification, as required, according to a further embodiment and transferred to another recovery tank 397b. The recovered oils including omega-3 fatty acids are polyunsaturated fatty acids with a double bond on the end of the carbon chain. They are considered essential fatty acids. Humans cannot readily make omega-3 fatty acids in their bodies, and therefore it must be obtained from other sources since they play an important role for normal metabolism.

In an exemplary embodiment, omega-3 fatty acids are recovered in amounts greater than or equal to about 5% of the original animal tissue feedstock (whereby 1 L=0.96 Kg). Preferably omega-3 fatty acids are recovered in amounts of greater than or equal to 6% of the original animal tissue feedstock, More preferably, omega-3 fatty acids are recovered in amounts greater than or equal to 7% of original animal tissue feedstock. [811 L/2*0.96=389 kg].

In yet another embodiment, the organic solvent/water may independently be recovered by employing extractive distillation. Namely, a third component is introduced into the process. For example, when isopropyl alcohol (IPA) is the organic solvent, diisopropyl ether (IPE) may be employed whereby IPA and IPE combine to completely separate water therefrom. The water is recovered at outlet 396 and may be further subjected to another ozone treatment. In still another exemplary embodiment, distilled water is recovered in amounts less than or equal to about 35% of the initial liquids portion entering the SLR system 37. Preferably, water is recovered in amounts less than or equal to about 30% of the liquids portion entering the SLR system 370. More preferably, water is recovered in amounts less than or equal to about 25% of the liquids portion.

On the other hand, the IPA/IPE mixture is then further distilled in a secondary distillation column to recover IPA. The IPA may be transferred to a recovery tank 395 for further processing as discussed above.

Results and Examples

The following examples illustrate specific aspects of the present invention. The examples are not intended to limit the scope of the present invention. Test results may vary for different types of fish species, but the method and system are applicable to all fish species. Table 2, as shown below, describes the composition an amino gram of solid, protein powder recovered from fish according to an embodiment of the present invention. Specifically, the yield of protein is 85.4%, moisture is 7.68%, crude fat is 1.42%.

TABLE 2

CERTIFICATE OF ANALYSIS
Sample Identification
Sample #: 05-5432 Advance Protein Powder, Serving = 35 g
Method:
B0202: Amino Acid Profile (Total) by AOAC 98170
PB100 NLEA Abbreviated Nutrient Package (Proximate)
Results: OF AMINO GRAM Sample #05-5432

| Test | /100 g | Serving | Units | Theoretical Level |
|---|---|---|---|---|
| Protein - Food | 85.4 | 29.9 | grams | 85-90% |
| Protein = Nitrogen × 6.38 | | | | |
| Ash | 9.20 | 3.22 | grams | |
| Moisture By Vacuum Oven | 7.68 | 2.69 | grams | |
| Crude Fat By Acid Hydrolysis | 1.42 | 0.497 | grams | 0.5% |
| Calories, Calculated | 340 | 119 | calories | |
| Total Amino Acid Profile | | | | |
| Tryptophan | 1.06 | 0.371 | grams | |
| Cysteine | 0.83 | 0.291 | grams | |
| Methionine | 2.51 | 0.879 | grams | |
| Aspartic Acid | 4.58 | 1.6 | grams | |
| Threonine | 2.15 | 0.753 | grams | |
| Serine | 1.64 | 0.574 | grams | |
| Glutamic Acid | 6.64 | 2.32 | grams | |
| Proline | 1.89 | 0.662 | grams | |
| Glycine | 2.54 | 0.889 | grams | |
| Alanine | 2.9 | 1.015 | grams | |
| Valine | 2.31 | 0.809 | grams | |
| Isoleucine | 2.03 | 0.711 | grams | |
| Leucine | 3.51 | 1.23 | grams | |
| Tyrosine | 1.54 | 0.539 | grams | |
| Phenylalanine | 1.86 | 0.651 | grams | |
| Lysine, Total | 3.92 | 1.37 | grams | |
| Histidine | 1.22 | 0.427 | grams | |
| Arginine | 2.97 | 1.04 | grams | |

As shown in Table 2, specific tests conducted on the recovered solid, protein powder derived from fish. As shown, the protein has over 98% digestible protein according to the well-known Pepsin test (0.2% Pepsin). Pepsin is a material that is used to digest protein structures. The Pepsin test is used to determine how much protein is within a mixture. The test involves analyzing the amount of protein that was digested, then back calculating that amount to the original quantity of protein material in the sample undergoing analysis. The trans fatty acid isomers are less than 0.1 wt. %, and preferably less than 0.05 wt. %. The amount of cholesterol is less than 0.1 wt. %, preferably less than 0.05 wt. %, and more preferably less than 0.02 wt. % of a 100 g serving.

TABLE 2

CERTIFICATE OF ANALYSIS
Sample identification:
Sample #: 05-5432 Advance Protein Powder, Serving = 35 g
Method:
B0003: Customized Analyses (Pepsin (0.2%) Digestible Protein)
B7033: Cholesterol by Gas Chromatography (GC), AOAC 994.10
Q0201: Total Trans Fatty Acid by Gas Chromatography (GC), AOAC 996.06
Results: Sample #05-5432

| Test | /100 g | /Serving | Units |
|---|---|---|---|
| Pepsin (0.2%) Digestible Protein | 98.1 | 34.3 | grams |
| Total Trans Fatty Acid Isomers | 0.02 | 0.007 | grams |
| Cholesterol | 0.0173 | 0.00605 | grams |

As shown in Table 3 below, an elemental scan of the solid protein power indicates the following elements present in mg per serving. Also shown below in Table 3 is the amount of each element in parts per million.

TABLE 3

CERTIFICATE OF ANALYSIS AMINOGRAM
Sample Identification:
Sample #: 05-5432 Advance Protein Powder. Serving = 35 g
Method:
AL194: Elemenlal Scan (65) by ICP MS
Results: Sample #05-5432

| Test Elemental | Result (mcg/serving) | Result (ppm) |
|---|---|---|
| Lithium | <35 | <1 |
| Boron | <35 | <1 |
| Magnesium | 56,000 | 1,600 |
| Phosphorus | 220,000 | 6,400 |
| Calcium | 770,000 | 22,000 |
| Titanium | 77 | 2.2 |
| Chromium | 91 | 2.6 |
| Iron | 4,600 | 130 |
| Nickel | <35 | <1 |
| Zinc | 2,070 | 59 |
| Germanium | <35 | <1 |
| Selenium | 91 | 2.6 |
| Strontium | 3,900 | 110 |
| Zirconium | <35 | <1 |
| Molybdenum | <35 | <1 |
| Rhodium | <35 | <1 |
| Silver | <35 | <1 |
| Indium | NA | NA |
| Antimony | <35 | <1 |
| Cesium | <35 | <1 |
| Lanthanum | <35 | <1 |
| Praseodymium | <35 | <1 |
| Beryllium | <35 | <1 |
| Sodium | 70,000 | 2,000 |
| Aluminum | 2,000 | 56 |
| Potassium | 190,000 | 5,500 |
| Scandium | <35 | <1 |
| Vanadium | <35 | <1 |
| Manganese | 120 | 3.3 |
| Cobalt | <35 | <1 |
| Copper | 160 | 4.7 |

| Test | Result (mcg/serving) | Advance International Corporation Result (ppm) |
|---|---|---|
| Gallium | <35 | <1 |
| Arsenic | <35 | <1 |
| Rubidium | 49 | 1.4 |
| Yttrium | <35 | <1 |
| Niobium | <35 | <1 |
| Ruthenium | <35 | <1 |
| Palladium | <35 | <1 |
| Cadmium | <35 | <1 |
| Tin | <180 | <5 |
| Tellurium | <35 | <1 |
| Barium | 63 | 1.8 |
| Cerium | <35 | <1 |
| Neodymium | <35 | <1 |
| Samarium | <35 | <1 |
| Gadolinium | <35 | <1 |
| Dysprosium | <35 | <1 |
| Erbium | <35 | <1 |

Table 4 shown below compares the nutritional content for 25 mg protein of one example of the recovered solid protein of the inventive process and system which subsequently has been milled into a powder "APP" versus 25 mg protein of commercial products on the market. APP is derived from fish. Specifically, APP has fewer calories than each of the commercial products except for NB soy. APP has fewer carbohydrates and fat than NB soy. Compared with JF soy, APP has fewer calories and less fat. Compared with each DFH whey, JF whey, GNC whey, Whey isolate and Whey concentrate, APP has fewer calories, carbohydrates, fat, saturated fat and cholesterol.

TABLE 4

| Standardized to 25 grams of protein per serving | | | | | | | |
|---|---|---|---|---|---|---|---|
| | APP | DFH whey | JF whey | GNC whey | Whey Isolate | Whey concent | JF soy | NB soy |
| Calories | 100 | 135 | 131 | 135 | 113 | 125 | 110 | 91 |
| Protein | 25 g | 25 g | 25 g | 25 g | 25 g | 25 g | 25 g | 25 g |
| Carbohydrate | 0 g | 3 g | 3 g | 4.2 g | 2.8 g | 3.1 g | 0 g | 0.7 g |
| Fat | 0 g | 2.1 g | 1.4 g | 2.1 g | 0.7 g | 1.6 g | 0.9 g | 0.2 g |
| Saturated Fat | 0 g | 2.1 g | 2.8 g | 1.0 g | 0.5 g | 1.0 g | 0 g | 0 g |
| Cholesterol | 0 g | 31.3 mg | 69.4 mg | 72.9 mg | 2.8 mg | 64.6 mg | 0 g | 0 g |

Table 5 shown below compares chemical elements existing in 25 mg of one example of the recovered solid protein of the inventive process and system which subsequently has been milled into powder "APP" versus 25 mg protein of commercial products on the market. APP is derived from fish. Notably, the calcium, iron and zinc contents of 25 mg APP is significantly greater than for each of DFH whey, JF whey, GNC whey, Whey Isolate, Whey concentrate, JF soy and NB soy. The amount of iron present in APP is significantly greater than in each of DFH whey, JF whey, GNC whey, Whey Isolate, and Whey concentrate.

TABLE 5

| Comparing mineral content per 25 grams of protein as a percentage of the RDA | | | | | | | | |
|---|---|---|---|---|---|---|---|---|
| | APP | DFH whey | JF whey | GNC whey | Whey Isolate | Whey concent | JF soy | NB soy |
| Calcium | 55% | 12.5% | 9.0% | | 8.3% | 18.8% | 2.9% | 5.0% |
| Iron | 18.1% | 4.2% | 1.8% | | | | 22.2% | 22.2% |
| Magnesium | 10% | | 3.5% | | | | | 2.8% |
| Zinc | 9.8% | | | | | | | 6.7% |
| Sodium | 2.1% | 2.0% | 17% | 2.6% | 2% | 2.3% | | 0.6% |
| Potassium | 4.6% | 4.6% | 3.7% | 5.7% | 8.7% | 3.7% | 10.6% | 12.9% |
| Phosphorus | 18.4% | 21.3% | 8.9% | | | | | 29.3% |

What is claimed is:

1. A system for recovering a protein powder meal from an animal tissue, the system comprising:
   a. an animal tissue feed;
   b. an organic solvent feed;
   c. a filter-drier-reaction tank including:
      (i) an inlet for receiving the animal tissue from the animal tissue feed and an organic solvent from the organic solvent feed,
      ii) a heating system for heating a mixture comprising the animal tissue and the organic solvent,
      (iii) a primary agitator assembly for mixing the mixture comprising the animal tissue and the organic solvent,
      (iv) a filter for separating a solid portion of the mixture comprising the animal tissue and the organic solvent from a heavy liquid; wherein the solid portion comprises the protein powder meal and wherein the heavy liquid comprises a recycled organic solvent;
      (v) an outlet for removing the solid portion; and
      (vi) an outlet for removing the heavy liquid;
   d. a solvent recovery system located downstream of the filter-drier-reaction tank; wherein the solvent recovery system comprises a filter and/or a distillation unit;
   e. a closed loop for recycling the recycled organic solvent; and
   f. an in-line activated carbon filter located within the closed loop.

2. The system according to claim 1, wherein the filter-drier-reaction tank is a single unitary structure.

3. The system according to claim 1, wherein the filter-drier-reaction tank further comprises a secondary agitator assembly.

4. The system according to claim 1, wherein the solvent recovery system comprises one or more distillation units.

5. The system according to claim 4, wherein the one or more distillation units are selected from the group consisting of Thin Film Evaporators, Wiped Film Evaporators, and Molecular Distillation units.

6. The system according to claim 1, further comprising a programmable logic controller.

7. The system according to claim 1, further comprising a recycled organic solvent system located downstream of the solvent recovery system for transporting the recovered organic solvent from the solvent recovery system back to the organic solvent feed.

8. The system according to claim 1, further comprising an ozone generator.

9. The system according to claim 1, further comprising:
   a preparation tank wherein the animal tissue from the animal tissue feed and the organic solvent from the organic solvent feed are mixed in the preparation tank to form the mixture comprising the animal tissue and the organic solvent to be delivered to the filter-drier-reaction tank.

10. The system according to claim 1, further comprising a volatile organic carbon recycling system comprising one or more condensers, to capture process emissions from the filter-drier-reaction tank.

11. The system according to claim 1, further comprising one or more mills located downstream of the filter-drier-reaction tank.

12. A system for recovering a protein powder meal from an animal tissue, the system comprising:
  a. an animal tissue feed;
  b. an organic solvent feed;
  c. a filter-drier-reaction tank including
    (i) an inlet for receiving the animal tissue from the animal tissue feed and an organic solvent from the organic solvent feed;
    (ii) a heating system for heating a mixture comprising the animal tissue and the organic solvent;
    (iii) a primary agitator assembly for mixing the mixture comprising the animal tissue and the organic solvent;
    (iv) a filter for separating a solid portion of the mixture comprising the animal tissue and the organic solvent from a heavy liquid; wherein the solid portion comprises the protein powder meal and wherein the heavy liquid comprises a recycled organic solvent;
    (v) an outlet for removing the solid portion; and
    (vi) an outlet for removing the heavy liquid;
  d. a solvent recovery system located downstream of the filter-drier-reaction tank; wherein the solvent recovery system comprises a filter and/or a distillation unit;
  e. a closed loop for recycling the recycled organic solvent; and
  f. an ozone generator.

13. The system according to claim 12, wherein the filter-drier-reaction tank is a single unitary structure.

14. The system according to claim 12, wherein the filter-drier-reaction tank further comprises a secondary agitator assembly.

15. The system according to claim 12, wherein the solvent recovery system comprises one or more distillation units.

16. The system according to claim 15, wherein the one or more distillation units are selected from the group consisting of thin film evaporators, wiped film evaporators, and molecular distillation units.

17. The system according to claim 12, further comprising a programmable logic controller.

18. The system according to claim 12, further comprising a recycled organic solvent system located downstream of the solvent recovery system for transporting recovered solvent from the solvent recovery system back to the organic solvent feed.

19. The system according to claim 12, further comprising a preparation tank wherein the animal tissue from the animal tissue feed and the organic solvent from the organic solvent feed are mixed in the preparation tank to from the mixture comprising the animal tissue and the organic solvent to be delivered to the filter-drier-reaction tank.

20. The system according to claim 12, further comprising a volatile organic carbon recycling system comprising one or more condensers, to capture process emissions from the filter-drier-reaction tank.

21. The system according to claim 12, further comprising one or more mills located downstream of the filter-drier-reaction tank.

22. A system for recovering a protein powder meal from an animal tissue, the system comprising:
  a. an animal tissue feed;
  b. an organic solvent feed;
  c. a filter-drier-reaction tank including
    (i) an inlet for receiving the animal tissue from the animal tissue feed and an organic solvent from the organic solvent feed;
    (ii) a heating system for heating a mixture comprising the animal tissue and the organic solvent;
    (iii) a primary agitator assembly for mixing the mixture comprising the animal tissue and the organic solvent;
    (iv) a filter for separating a solid portion of the mixture comprising the animal tissue and the organic solvent from a heavy liquid; wherein the solid portion comprises the protein powder meal and wherein the heavy liquid comprises a recycled organic solvent;
    (v) an outlet for removing the solid portion;
    (vi) an outlet for removing the heavy liquid; and
  d. a solvent recovery system located downstream of the filter-drier-reaction tank; wherein the solvent recovery system comprises a filter and/or a distillation unit;
  e. a closed loop for recycling the recycled organic solvent; and
  f. a volatile organic carbon recycling system comprising one or more condensers, to capture process emissions from the filter-drier-reaction tank.

23. The system according to claim 22, wherein the filter-drier-reaction tank is a single unitary structure.

24. The system according to claim 22, wherein the filter-drier-reaction tank further comprises a secondary agitator assembly.

25. The system according to claim 22, wherein the solvent recovery system comprises one or more distillation units.

26. The system according to claim 25, wherein the one or more distillation units are selected from the group consisting of thin film evaporators, wiped film evaporators, and molecular distillation units.

27. The system according to claim 22, further comprising a programmable logic controller.

28. The system according to claim 22, further comprising a recycled organic solvent system located downstream of the solvent recovery system for transporting recovered solvent from the solvent recovery system back to the organic solvent feed.

29. The system according to claim 22, further comprising a preparation tank wherein the animal tissue from the animal tissue feed and the organic solvent from the organic solvent feed are mixed in the preparation tank to from the mixture comprising the animal tissue and the organic solvent to be delivered to the filter-drier-reaction tank.

30. The system according to claim 22, further comprising one or more mills located downstream of the filter-drier-reaction tank.

31. A system for recovering a protein powder meal from an animal tissue, the system comprising:
  a. an animal tissue feed;
  b. an organic solvent feed;
  c. a filter-drier-reaction tank including
    (i) an inlet for receiving the animal tissue from the animal tissue feed and an organic solvent from the organic solvent feed;
    (ii) a heating system for heating a mixture comprising the animal tissue and the organic solvent;
    (iii) a primary agitator assembly for mixing the mixture comprising the animal tissue and the organic solvent;
    (iv) a filter for separating a solid portion of the mixture comprising the animal tissue and the organic solvent from a heavy liquid; wherein the solid portion comprises the protein powder meal and wherein the heavy liquid comprises a recycled organic solvent;
    (v) an outlet for removing the solid portion; and
    (vi) an outlet for removing the heavy liquid; and
  d. a solvent recovery system located downstream of the filter-drier-reaction tank; wherein the solvent recovery system comprises a filter and/or a distillation unit;

e. a closed loop for recycling the recycled organic solvent; and f. one or more mills located downstream of the filter-drier-reaction tank.

32. The system according to claim 31, wherein the filter-drier-reaction tank is a single unitary structure.

33. The system according to claim 31, wherein the filter-drier-reaction tank further comprises a secondary agitator assembly.

34. The system according to claim 31, further comprising a programmable logic controller.

35. The system according to claim 31, wherein the solvent recovery system comprises one or more distillation units.

36. The system according to claim 35, wherein the one or more distillation units are selected from the group consisting of thin film evaporators, wiped film evaporators, and molecular distillation units.

37. The system according to claim 31, further comprising a recycled organic solvent system located downstream of the solvent recovery system for transporting recovered solvent from the solvent recovery system back to the organic solvent feed.

38. The system according to claim 31, further comprising a preparation tank wherein the animal tissue from the animal tissue feed and the organic solvent from the organic solvent feed are mixed in the preparation tank to from the mixture comprising the animal tissue and the organic solvent to be delivered to the filter-drier-reaction tank.

* * * * *